(12) United States Patent
Elliott et al.

(10) Patent No.: US 6,895,091 B1
(45) Date of Patent: May 17, 2005

(54) SYSTEMS AND METHODS FOR ENCRYPTION KEY ARCHIVAL AND AUDITING IN A QUANTUM-CRYPTOGRAPHIC COMMUNICATIONS NETWORK

(75) Inventors: Brig Barnum Elliott, Arlington, MA (US); Anthony Michel, Lexington, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 1029 days.

(21) Appl. No.: 09/612,133

(22) Filed: Jul. 7, 2000

(51) Int. Cl.[7] .............................................. H04N 7/167
(52) U.S. Cl. ....................... 380/278; 380/279; 380/286; 380/44
(58) Field of Search ................................ 380/278, 279, 380/286, 44

(56) References Cited

U.S. PATENT DOCUMENTS

| | | | |
|---|---|---|---|
| 4,888,800 A | 12/1989 | Marshall et al. .............. 380/21 |
| 5,243,649 A | 9/1993 | Franson | |
| 5,339,182 A | 8/1994 | Kimble et al. | |
| 5,414,771 A | 5/1995 | Fawcett, Jr. | |
| 5,495,533 A | 2/1996 | Linehan et al. ................ 380/21 |
| 5,675,648 A | 10/1997 | Townsend | |
| 5,732,139 A | 3/1998 | Lo et al. | |
| 5,757,912 A | 5/1998 | Blow | |
| 5,764,765 A | 6/1998 | Phoenix et al. | |
| 5,768,378 A | 6/1998 | Townsend et al. | |
| 5,850,441 A | 12/1998 | Townsend et al. | |
| 5,883,956 A | 3/1999 | Le et al. .......................... 380/4 |
| 5,901,227 A | 5/1999 | Perlman ......................... 380/21 |
| 5,917,911 A | 6/1999 | Dabbish et al. ................ 380/21 |
| 5,933,503 A | 8/1999 | Schell et al. ................... 380/25 |
| 5,953,421 A | 9/1999 | Townsend | |
| 5,966,224 A | 10/1999 | Hughes et al. | |

OTHER PUBLICATIONS

Violations of a New Inequality for Classical Fields; Fransom, J.D.; Johns Hopkins University; NTIS–NASA Publication; Goddard Space Flight Center; Workshop on Squeezed States and Uncertainty Relations, Feb. 1991, pp. 23–32.

Quantum Cryptography Defies Eavesdropping; Collins, Gary; Physics Today; Nov. 1992; pp. 21–23.

Quantum Public Key Distribution System; IBM Technical Disclosure Bulletin; vol. 28, No. 7; pp. 3151–3163; Dec. 1985.

Single Photon Interference in 10 km Long Optical Fibre Interferometer; P.D. Townsend et al.; Electronics Letters; vol. 29, No. 7; pp. 634–635; Apr. 1, 1993.

Enhanced Single Photon Fringe Visibility in A 10 km Long Prototype Quantum Cryptography Channel; P.D. Townsend et al.; Electronics Letters; vol. 29, No. 14; pp. 1291–1293; Jul. 1993.

Secure Key Distribution System Based on Quantum Cryptography; P.D. Townsend; Electronics Letters; vol. 30, No. 10; pp. 809–811; May 12, 1994.

Multi–User Quantum Cryptography on Optical Networks; Simon J.D. Phoenix et al.; vol. 42, No. 6; pp. 1155–1163; Jun. 1995.

*Primary Examiner*—Thomas R. Peeso
(74) *Attorney, Agent, or Firm*—Leonard C. Suchyta, Esq.; Joel Wall, Esq.

(57) ABSTRACT

A system archives encryption keys used for encrypting information in a network (105). The system includes a plurality of nodes configured to collect one or more encryption keys generated at each node and to transmit the one or more collected encryption keys to a key archive (110) for storage in a database associated with the key archive (110). The key archive (110) is configured to receive encryptions keys transmitted from nodes in the network and to store the encryption keys in a database of the key archive.

29 Claims, 17 Drawing Sheets

720

NODE B
FORWARDING TABLE

| DESTINATION NODE 815 | NEXT HOP 805 | QC-LINK PROTECTION VARIABLE 810 |
|---|---|---|
| A | A | P |
| C | C | NP |
| D | C | NP |
| E | C | NP |
| F | F | P |
| G | G | NP |
| H | F | P |
| I | F | P |

NP = UNPROTECTED LINK
P = PROTECTED LINK

725

NODE B
PROTECTED LINK
FORWARDING TABLE

| DESTINATION NODE 915 | NEXT HOP 905 | QC-LINK PROTECTION VARIABLE 910 |
|---|---|---|
| A | A | P |
| C | F | P |
| D | F | P |
| E | F | P |
| F | F | P |
| G | F | P |
| H | F | P |
| I | F | P |

P = PROTECTED LINK

SYSTEMS AND METHODS FOR ENCRYPTION KEY ARCHIVAL AND AUDITING IN A QUANTUM-CRYPTOGRAPHIC COMMUNICATIONS NETWORK

The present application is related to co-pending Application No. 09/611,783, entitled "Systems and Methods for Implementing a Quantum-Cryptographic Communications Network," filed on an even date herewith.

FIELD OF THE INVENTION

The present invention relates generally to systems and methods for maintaining secure communications in communications networks and, more particularly, to systems and methods for archiving and auditing encryption keys used for secure communications in communications networks.

BACKGROUND OF THE INVENTION

Conventional packet-switching networks permit cheap and reliable communications independent of the distance between a source node and a destination node in the network. Conventional networks, however, rely upon either public keys or shared private keys to provide privacy for messages that pass through the network's links. Public keys have the drawback that they have never been proven to be difficult to decipher. Therefore, it is possible that an efficient means of cracking public keys may one day be discovered. The result of such a discovery would be that all public key technology would become obsolete. All supposedly "secure" networks based on public key technology would thus become vulnerable. Shared private keys also have the drawback that the logistics of distributing the private keys can be prohibitive.

Quantum cryptography represents a recent technological development that provides for the assured privacy of a communications link. Quantum cryptography is founded upon the laws of quantum physics and permits the detection of eavesdropping across a link. Quantum cryptography, thus, ensures the security of keys distributed across the link. Quantum cryptographic techniques have been conventionally applied across single links in a network. Quantum cryptography requires the reliable transmission and receipt of single photons for distributing encryption/decryption keys. However, single photons cannot be reliably transmitted over large distances. Single quantum cryptographic links are, therefore, distance limited. For example, a single quantum cryptographic link cannot be any longer than some tens of miles when transmitting through fiber optic cabling.

Therefore, there exists a need for a system and method that combines the assured privacy achieved with quantum cryptography with the distance independent communication achieved with conventional multi-node, multi-link packet switching networks.

SUMMARY OF THE INVENTION

Systems and methods consistent with the present invention address this need by implementing a quantum-cryptographic communications network that permits privacy assured communication over large distances. The communications network of the present invention implements quantum cryptographic techniques that can ensure the privacy of encrypted data transmitted across multiple nodes and links within a packet-switching network. A host can thus send encrypted data in a quantum-cryptographic communications network consistent with the present invention and be assured of the security of the data received at a destination host.

Systems and methods consistent with the present invention additionally provide a key archive that can store and audit the encryption keys generated and used in a quantum-cryptographic communications network. Encryption key audits permit validation of keys used throughout the quantum-cryptographic network. The validations can provide indications of failures in quantum cryptographic mechanisms, or associated keying algorithms, that can be noted and acted upon by a network security authority.

In accordance with the purpose of the invention as embodied and broadly described herein, a method of archiving encryption keys used for encrypting information in a network includes collecting one or more encryption keys generated at at least one node in the network. The method further includes transmitting the one or more collected encryption keys to a key archive. The method also includes storing the collected encryption keys in a database of the key archive.

In another implementation consistent with the present invention, a method of archiving encryption keys used for encrypting information in a network includes receiving encryption keys generated at a plurality of nodes in a network, and storing the received encryption keys in encryption key archive.

In a further implementation consistent with the present invention, a method of auditing encryption keys used for encrypting information in a network includes collecting one or more encryption keys generated at a node for encrypting data, providing the one or more collected encryption keys to a key archive, storing the collected encryption keys in a database of the key archive, and determining whether at least one of the one or more collected keys satisfies given standards.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, permit the implementation of quantum cryptographic techniques in multi-node packet-switching networks. In quantum cryptography, encryption keys are derived from random bit sequences that are encoded in the phase/polarization states of single photons transmitted from one node to the next. Based on the known Heisenberg Uncertainty principle, any attempt to eavesdrop upon the transmitted encryption keys will induce error rates in the received encryption keys that can be detected at the receiving node. Quantum cryptography can thus detect eavesdropping, and in accordance with the present invention, provide link security information that can be used in forwarding encrypted messages across a network.

Exemplary Network

Figure 1:
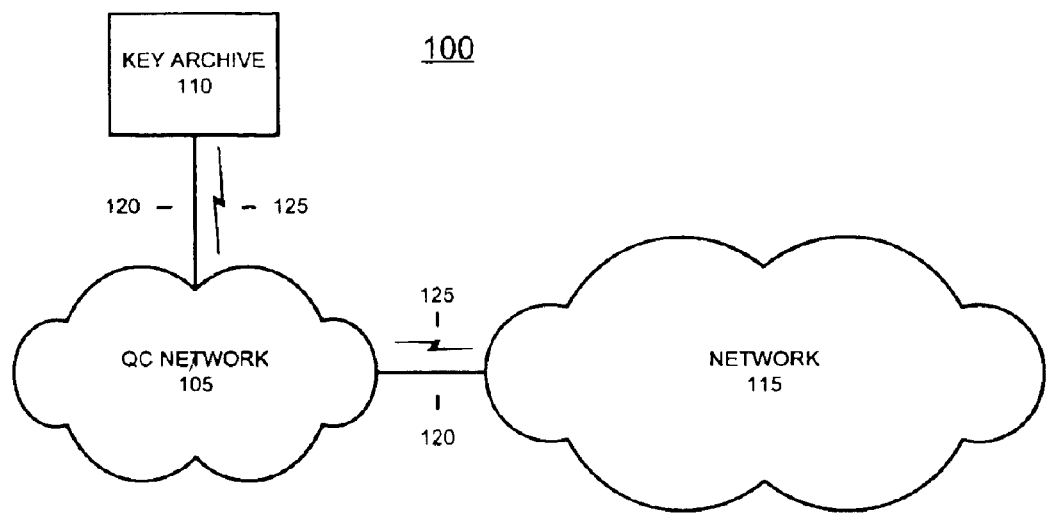
FIGS. 1 and 2 illustrate exemplary networks consistent with the present invention.

FIG. 1 is a diagram of a first exemplary network 100 that includes a quantum cryptographic network (QC-network) 105 that implements quantum cryptographic techniques in accordance with the present invention. Network 100 includes a QC-network 105 connected to a network 115 and a key archive 110 via wired (120), wireless (125) or optical connection links (not shown). QC network 105 may include one or more interconnected routers and hosts. The routers of QC network 105 can include "trusted" routers that are either installed in secure facilities or constructed with high-assurance software and hardware for the prevention of tampering. Network 115 can include any type of network, including a local area network (LAN), metropolitan area network (MAN), wide area network (WAN), Internet, Intranet, or Public Switched Telephone Network (PSTN).

Key archive 110 stores keys received from QC network 105 in a database in memory and can include a single server or multiple distributed servers.

Figure 2:
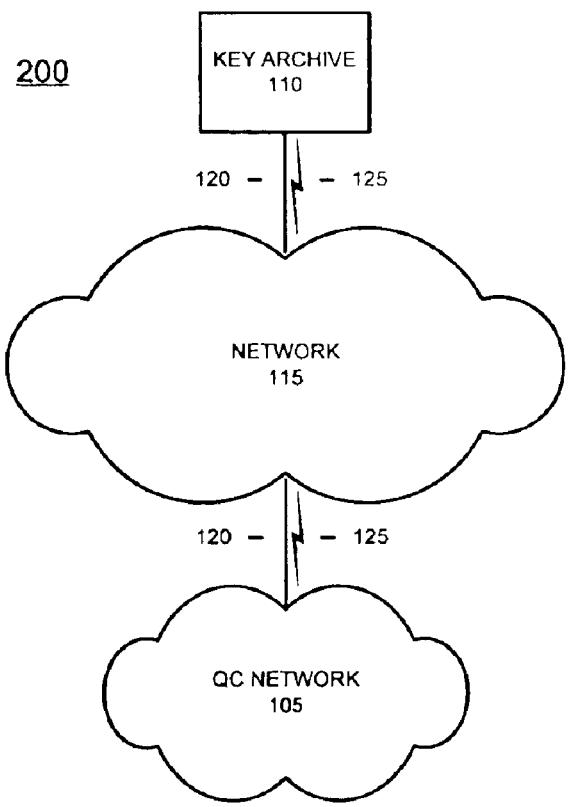

FIG. 2 is a diagram of a second exemplary network 200 in which key archive 110 connects to network 115, and not directly to QC network 105, as in network 100 above. Network 200 includes a QC network 105 connected to a network 115 via wired (120), wireless (125) or optical connection links (not shown). Network 200 additionally includes key archive 10 connected to network 115 via wired (120), wireless (125) or optical connection links (not shown).

Exemplary Key Archive

Figure 3:
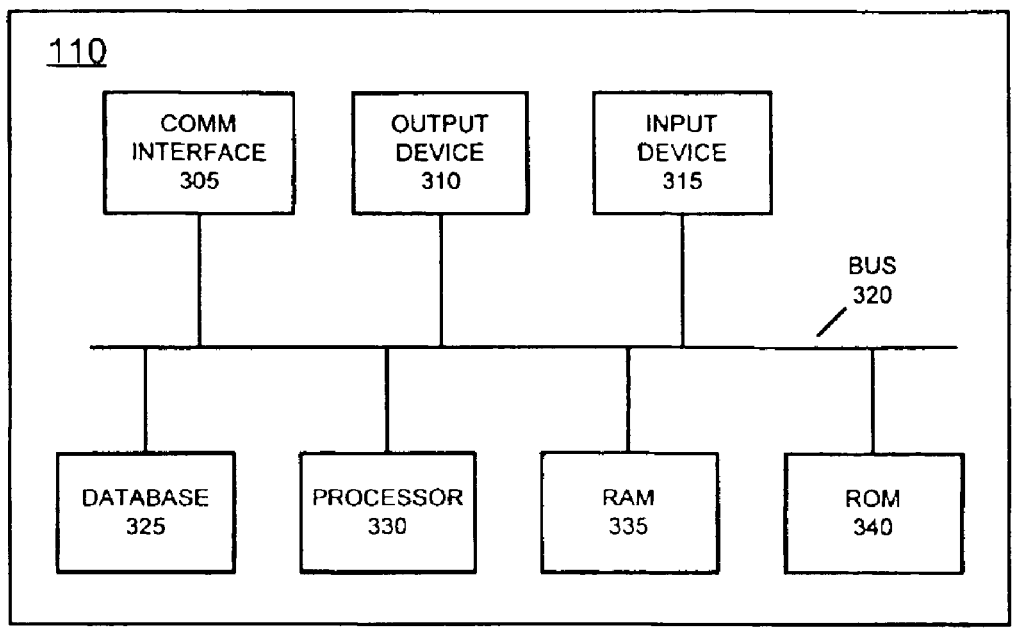
FIG. 3 illustrates exemplary components of a key archive consistent with the present invention.

FIG. 3 illustrates components of key archive 10. Key archive 10 may include a communication interface 305, an output device 310, an input device 315, a database 325, a processor 330, a Random Access Memory (RAM) 335, a Read Only Memory (ROM) 340, and a bus 320. Communication interface 305 connects key archive 10 to another device or network, such as QC-network 105 or network 115. Input device 315 permits entry of data into key archive 110 and output device 310 permits the output of key archive data in video, audio, or hard copy format.

Processor 330 performs all data processing functions for inputting, outputting, and processing of key data. RAM 335 provides temporary working storage of key archive data and instructions for use by processor 330. ROM 340 provides permanent or semi-permanent storage of data and instructions for use by processor 330. Bus 320 interconnects the various components of key archive 110 and allows the components to communicate with one another. Database 325 maintains key information and may include a large-capacity storage device, such as a magnetic or optical recording medium and its corresponding drive.

Exemplary Key Archive Database

Figure 4:
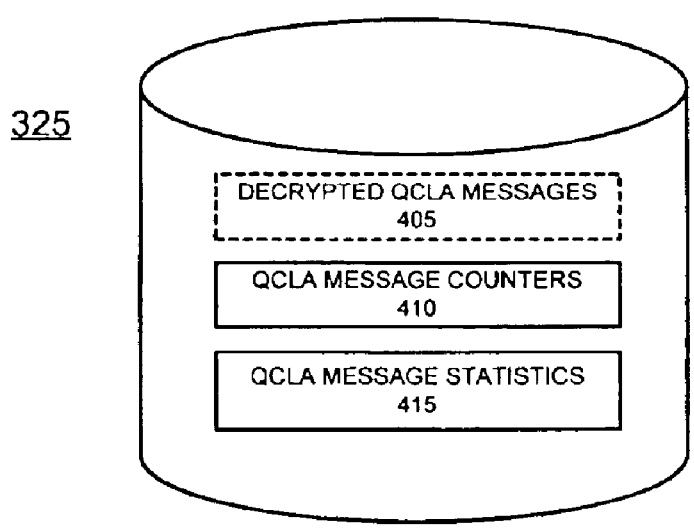
FIG. 4 illustrates an exemplary database stored in memory of a key archive consistent with the present invention.

FIG. 4 illustrates an exemplary database 325 of key archive 10. Database 325 may include decrypted Quantum Cryptographic Link Agent (QCLA) messages 405, QCLA message counters 410 and QCLA message statistics 415.

Decrypted QCLA messages 405 include decrypted messages received from QCLA's in QC-network 105 and may contain collections of keying bits from each QCLA.

QCLA message counters 410 include counters that keep track of a number of parameters concerning the QCLA's within QC-network 105. Such parameters can include the number of indecipherable messages received from each QCLA in QC-network 105, the total number of messages received from each QCLA in QC-network 105, and the number of validation failures associated with keys from each QCLA in QC-network 105.

QCLA message statistics 415 include data derived from validations performed upon individual keys, or collections of keys, from QCLAs in QC-network 105.

Exemplary QC-Network

Figure 5:
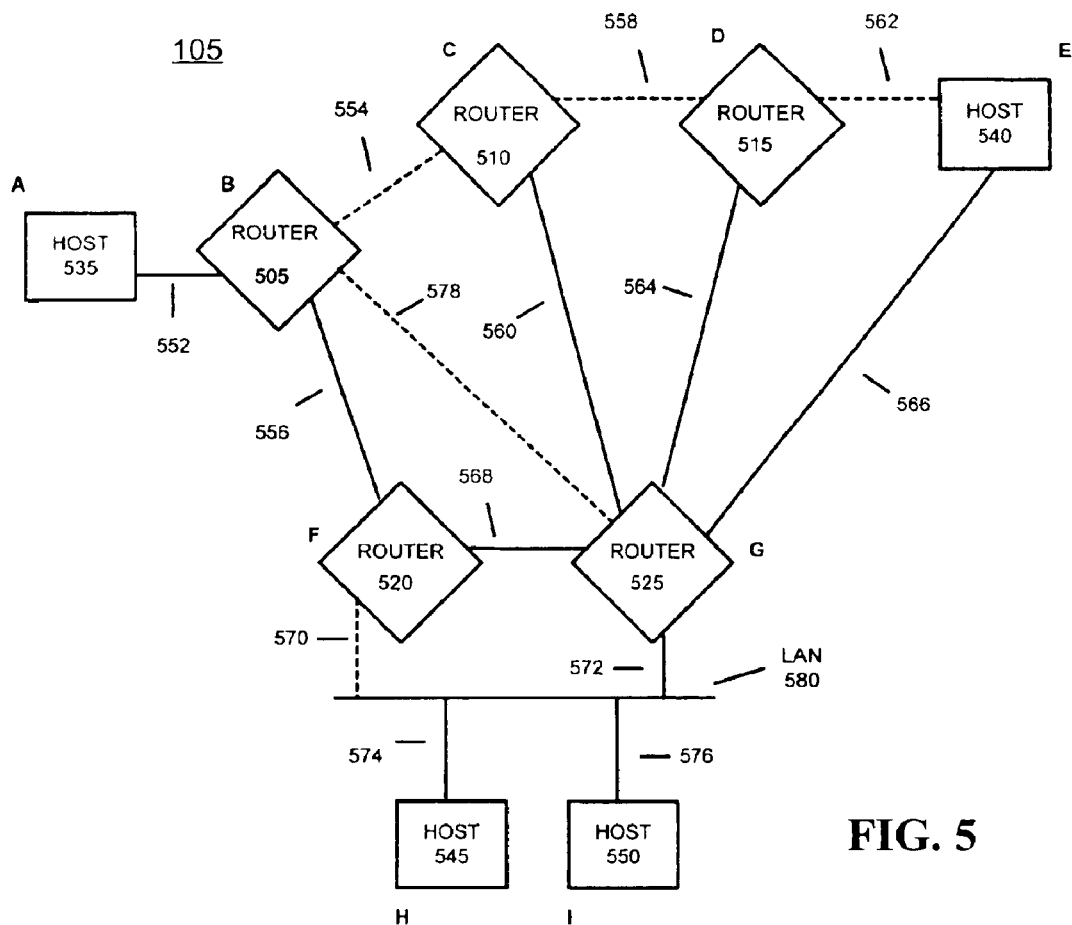
FIG. 5 illustrates an exemplary quantum-cryptographic network consistent with the present invention.

FIG. 5 is a diagram of an exemplary quantum cryptographic network (QC-network) 105 implementing quantum cryptographic techniques in accordance with the present invention. Network 105 includes routers 505, 510, 515, 520 and 525 and hosts 535, 540, 545 and 550 interconnected via links 552–578. Routers 505, 510, 515, 520 and 525 can include Internet routers, multi-protocol routers, Ethernet switches, ATM switches or the like. Routers 505, 510, 515, 520 and 525 can further include "trusted" routers that are either installed in secure facilities or constructed with high-assurance software and hardware for the prevention of tampering.

Hosts 535, 540, 545 and 550 can include personal computers, telephones based on microprocessors (e.g., cellular telephones, voice over IP telephones), computer game machines (e.g., Gameboy), small network-resident devices (e.g., thermostats, sensors, actuators, or other network appliances) or the like. Links 552–578 may comprise one or more wireless, wire-line, or optical links. The number of hosts, routers and specific link connections shown in FIG. 5 are for illustrative purposes only. One skilled in the art will recognize that QC-network 105 can include any number of hosts and routers and any number of link connections between the hosts and routers.

In the exemplary network illustrated in FIG. 5, host 535 (node A) connects to router 505 (node B) via link 552. Router 505 connects to router 510 (node C), router 520 (node F), and router 525 (node G) via links 554, 556 and 578, respectively. Router 510 connects to routers 515 (node D) and 525 (node G) via links 558 and 560, respectively. Router 515 connects to host 540 (node E) and router 525 via links 562 and 564, respectively. Host 540 connects to router 525 via link 566. Router 520 connects to router 525 and local area network (LAN) 580 via links 568 and 570, respectively. Router 525 connects to LAN 580 via link 572. Hosts 545 (node H) and 550 (node I) connect to LAN 580 via links 574 and 576, respectively. Links 554, 570 and 578, shown as dashed links in FIG. 5, depict links unprotected by quantum cryptographic techniques. All other links, shown as solid lines in FIG. 5, depict links protected by quantum cryptographic techniques.

Exemplary Host/Router

Figure 6:
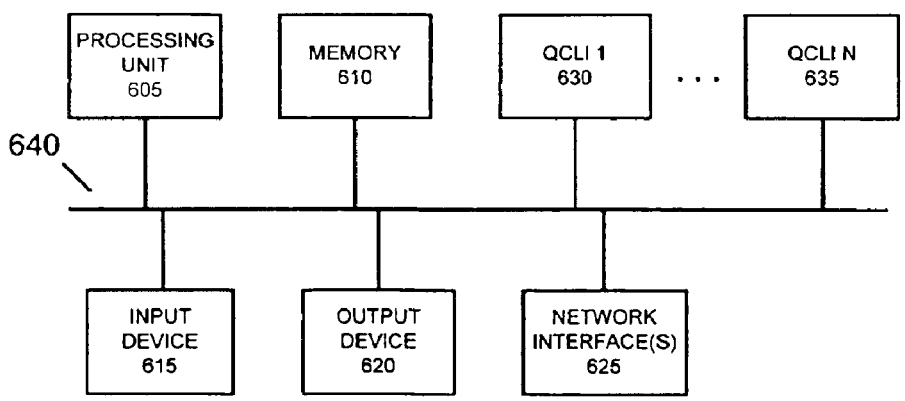
FIG. 6 illustrates exemplary components of a host/router consistent with the present invention.

FIG. 6 illustrates components of an exemplary router 505 in which quantum cryptographic techniques can be implemented. Routers 510, 515, 520 and 525 and hosts 535, 540, 545 and 550 may be similarly configured to router 505. Router 505 may include a processing unit 605, a memory 610, an input device 615, an output device 620, one or more network interfaces 625, one or more quantum cryptographic link interfaces (QCLI 1 630-QCLI N 635) and a bus 640.

Processing unit 605 may perform all data processing functions for inputting, outputting, and processing of data. Memory 610 may include Random Access Memory (RAM) that provides temporary working storage of data and instructions for use by processing unit 605 in performing processing functions. Memory 610 may additionally include Read Only Memory (ROM) that provides permanent or semi-permanent storage of data and instructions for use by processing unit 605. Memory 610 can include large-capacity storage devices, such as a magnetic and/or optical recording medium and its corresponding drive.

Input device 615 permits entry of data into router 505 and includes a user interface (not shown). Output device 620 permits the output of data in video, audio, or hard copy format. Network interface(s) 625 interconnect router 505 with QC-network 105 via links unprotected by quantum cryptographic techniques. QCLI 1 630 through QCLI 635 interconnect host 535 with network 105 via links protected by quantum cryptographic techniques. Bus 640 interconnects the various components of router 505 to permit the components to communicate with one another.

Exemplary Router Database

Figures 7, 8, 9:
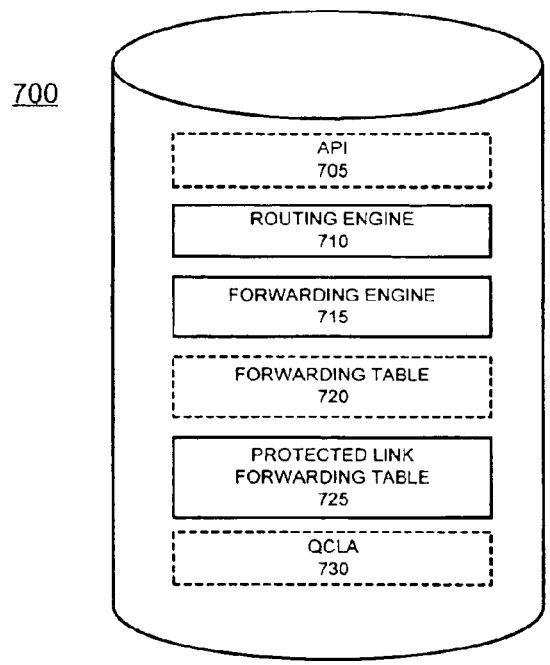
FIG. 7 illustrates an exemplary database stored in memory of a host/router consistent with the present invention.
FIG. 8 illustrates an exemplary forwarding table consistent with the present invention.
FIG. 9 illustrates an exemplary protected link forwarding table consistent with the present invention.

FIG. 7 illustrates an exemplary database 700 stored in memory 610 of router 505. Database 700 may include an optional Application Programmer Interface (API) 705, a routing engine 710, a forwarding engine 715, an optional forwarding table 720, a protected link forwarding table 725, and an optional Quantum Cryptographic Link Agent (QCLA) 730. API 705 includes sequences of instructions for execution by processing unit 605 that interface conventional network transport protocols to application programs being executed by processing unit 605. API 705 defines the syntax for communication between the conventional network transport protocols and the application programs.

Routing engine 710 includes sequences of instructions for execution by processing unit 605. Among other functions, these instructions determine how network traffic received at router 505 should be directed to other nodes in QC-network 105. Routing engine 710 also includes instructions for monitoring the conditions of the links in QC-network 105, exchanging control messages with peer routing engines of other nodes in QC-network 105 and building forwarding tables that can be used to direct received messages towards their intended destination nodes.

Forwarding engine 715 includes sequences of instructions for execution by processing unit 605. Among other functions, these instructions perform the processing involved in forwarding message traffic through the appropriate interface of router 505 and toward the appropriate next-hop in QC-network 105.

Forwarding table 720 includes a table of destination nodes in network 105 and an indication of a next hop for a message to reach each destination node via either protected or unprotected links. Forwarding table 720 may also include a QC-link protection variable associated with each next hop indicating whether the message will traverse an unprotected or a protected link if forwarded on to the indicated next hop to reach a destination node.

Protected link forwarding table 725 includes a table of destination nodes in network 105 and an indication of a next hop for a message to reach each destination node via protected links. If QC-network 105 handles only secure message traffic, then database 700 may only store protected link forwarding table 725. Database 700 would not require forwarding table 720.

QCLA 730 includes sequences of instructions for execution by processing unit 605. Among other functions, these instructions perform the processing involved in collecting encryption keying bits generated by each QCLI of each node within QC-network 105. QCLA 730 further performs the processing involved in timestamping and tagging collected encryption keys and delivering the collected keys to key archive 110 (as further described below).

Exemplary Forwarding Table

FIG. 8 illustrates an exemplary forwarding table 720 containing data for forwarding packet data, received at, for example, router 505 (node B), to any other node within QC-network 105 via either protected or unprotected links. Forwarding table 720 may include next hop entries 805 and QC-link protection variable entries 810 indexed to destination node entries 815. Destination node entries 815 indicate the destination nodes reachable from the current node (e.g., node B). Next hop entries 805 indicate the next node to which the current node should forward a message to reach a desired destination node. QC-link protection variable entries 810 indicate the protective state of the link between a current node and a next hop node.

Exemplary Protected Link Forwarding Table

FIG. 9 illustrates an exemplary protected link forwarding table 725 containing data for forwarding packet data, received at, for example, router 505 (node B), to any other node within QC-network 105 via only protected links. Protected link forwarding table 725 may include next hop entries 905 and QC-link protection variable entries 910 indexed to destination node entries 915. Destination node entries 915 indicate the destination nodes reachable from the current node (e.g., node B). Next hop entries 905 indicate the next node to which the current node should forward a message to reach a desired destination node. QC-link protection variable entries 910 indicate the protective state of the link between a current node and a next hop node.

Exemplary Quantum Cryptographic Link Interface

Figure 10:
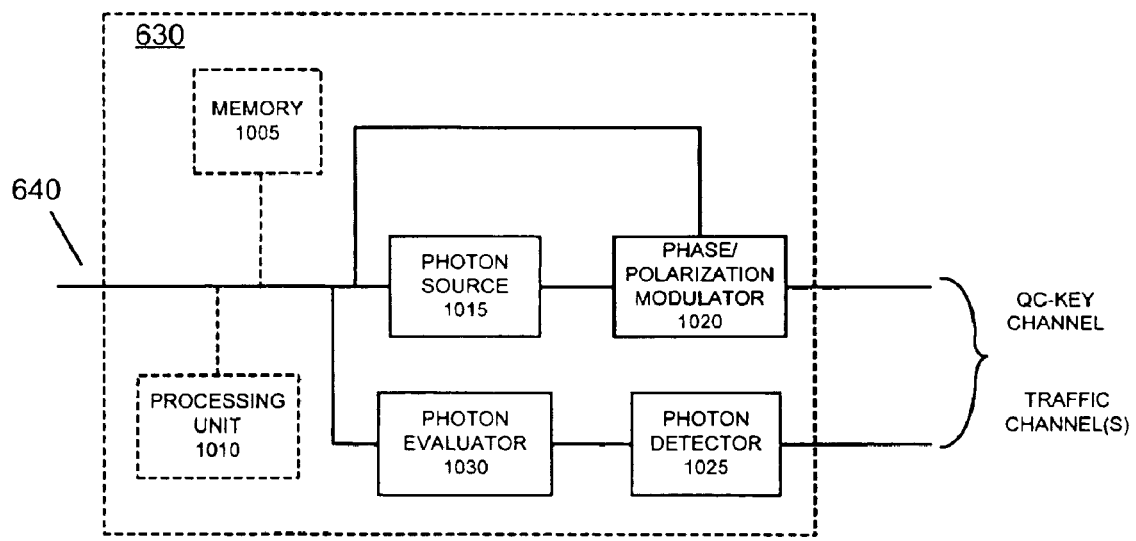
FIG. 10 illustrates a exemplary components of a quantum cryptographic link interface consistent with the present invention.

FIG. 10 is a diagram illustrating exemplary components of quantum cryptographic link interface QCLI 1 630. Other QCLI's in routers 505, 510, 515, 520 and 525 may be configured similarly to router QCLI 630 shown in FIG. 10. QCLI 630 may include an optional memory 1005, an optional processing unit 1010, a photon source 1015, a phase/polarization modulator 1020, a photon detector 1025, a photon evaluator 1030, and a bus 640.

Memory 1005 may include RAM that provides temporary working storage of data and instructions for use by processing unit 1010 in performing processing functions. Memory 1005 may additionally include ROM that provides permanent or semi-permanent storage of data and instructions for use by processing unit 1010. Memory 1005 may include large-capacity storage devices, such as a magnetic and/or optical recording medium and its corresponding drive.

Processing unit 1010 may perform all data processing functions for inputting, outputting, and processing of data, including execution of instructions stored in memory 1005 or memory 610 for implementing conventional quantum cryptographic protocols. Processing unit 1010 may generate encryption keying bits according to conventional encryption algorithms.

Photon source 1015 can include, for example, a conventional semiconductor laser. Photon source 1015 produces photon signals according to instructions provided by either processing unit 1010 or processing unit 605.

Phase/polarization modulator 1020 can include, for example, conventional semiconductor phase modulators or conventional liquid crystal polarization modulators. Phase/polarization modulator 1020 encodes outgoing photon signals from photon source 1015 according to commands received from processing unit 1010 or processing unit 605 for transmission across conventional quantum cryptographic key (QC-key) or traffic channel(s).

Photon detector 1025 can include, for example, conventional avalanche photo diodes (APDs) or conventional photo-multiplier tubes (PMTs). Photon detector 1025 detects photon signals received across conventional QC-key or traffic channel(s) from other QCLI's in QC-network 105.

Photon evaluator 1030 can include conventional circuitry for processing and evaluating output signals from photon detector 1025 in accordance with conventional quantum cryptographic techniques.

Exemplary Quantum Cryptographic Link Interface Database

Figure 11:
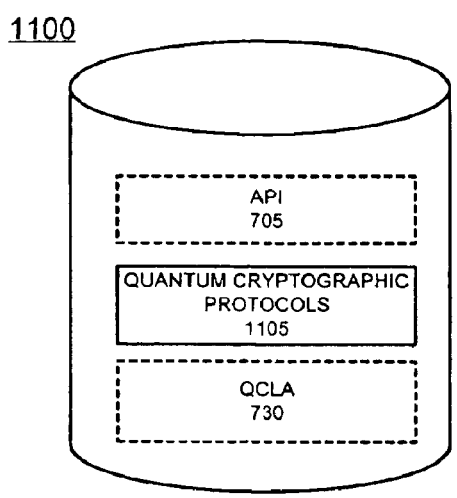
FIG. 11 illustrates an exemplary database stored in memory of a quantum cryptographic link interface consistent with the present invention.

FIG. 11 illustrates an exemplary database 1100 that may be stored in memory 1005 of QCLI 630. Database 1100 may optionally include Application Programmer Interface (API) 705 and may further include quantum cryptographic protocols 1105 and QCLA 730.

Quantum cryptographic protocols 1105 include all protocols for implementing quantum cryptographic encryption across a link connected to router 505. These conventional protocols are known to one skilled in the art. As such, they will not be described in further detail herein.

Exemplary QC-Link Initialization Processing

Figure 12:
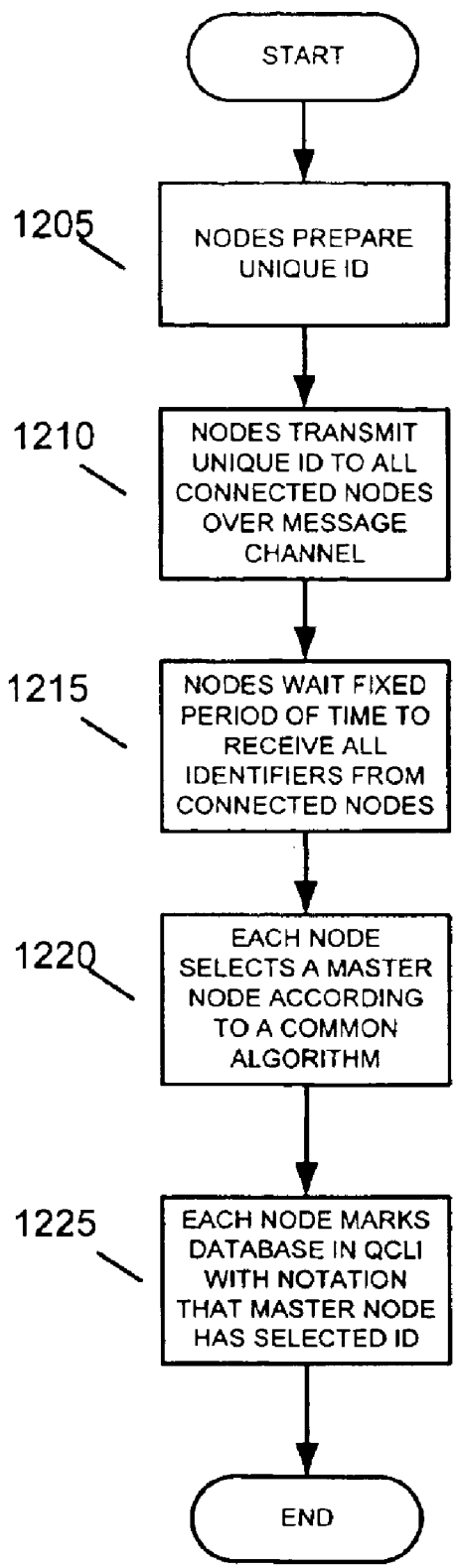
FIG. 12 illustrates exemplary system processing for QC-link initialization consistent with the present invention.

FIG. 12 illustrates a flowchart of exemplary quantum cryptographic link initialization processing consistent with the present invention. The initialization processing shown in FIG. 12 establishes the operational status of a quantum cryptographic link between any two QC-nodes in network 105. As one skilled in the art will appreciate, the method exemplified by FIG. 12 can, for example, be implemented as a sequence of instructions and stored in memory 610 of router 505 for execution by processing unit 605.

Initialization processing begins with each QC-node in network 105 preparing a unique identifier for identifying itself [step 1205]. This identifier may be preset in memory 610 by the node manufacturer, selected by a node administrator, derived from a random or pseudo-random process, or derived by any other appropriate method. Each QC-node then transmits its unique identifier to all connected nodes over a traffic channel [step 1210]. Transmission of the unique identifier from each QC-node may be repeated, staggered in time, or acknowledged in accordance with conventional message transmission techniques.

Each QC-node in network 105 waits a fixed period of time to receive all unique identifiers transmitted from connected nodes [step 1215]. This fixed period of time may be preset or periodically updated according to network topology. Each QC-node selects a "master" node according to an algorithm common to all nodes in network 105 [step 1220]. The common algorithm can, for example, determine which identifier of all of the identifiers received from connected nodes is the arithmetic minimum. Other algorithms will be apparent to one skilled in the art for selecting an identifier from a set of identifiers received from nodes connected to a node in network 105.

Each QC-node then marks an internal database in its QCLI that the master node has the selected identifier [step 1225]. The QC-node with the selected identifier then begins acting as the master node and all other connected nodes begin to act as slave nodes. The node acting as the master node transmits the QC key to the slave nodes. The slave nodes perform the quantum cryptographic algorithms that enable the link to function.

Exemplary QC-Link Security Detection Processing

Figure 13:
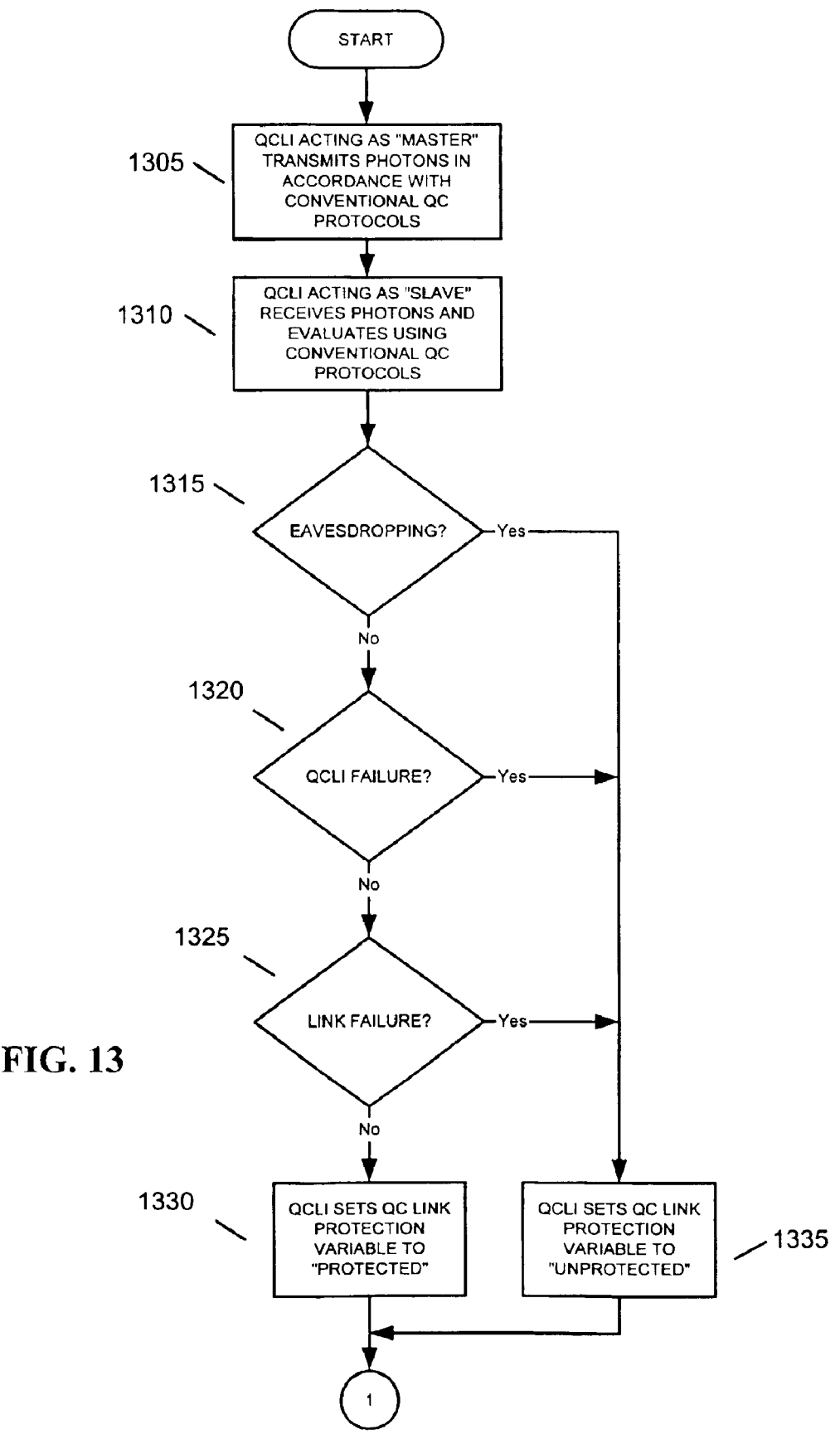
FIGS. 13–14 illustrate exemplary system processing for QC-link security detection consistent with the present invention.
Figure 14:
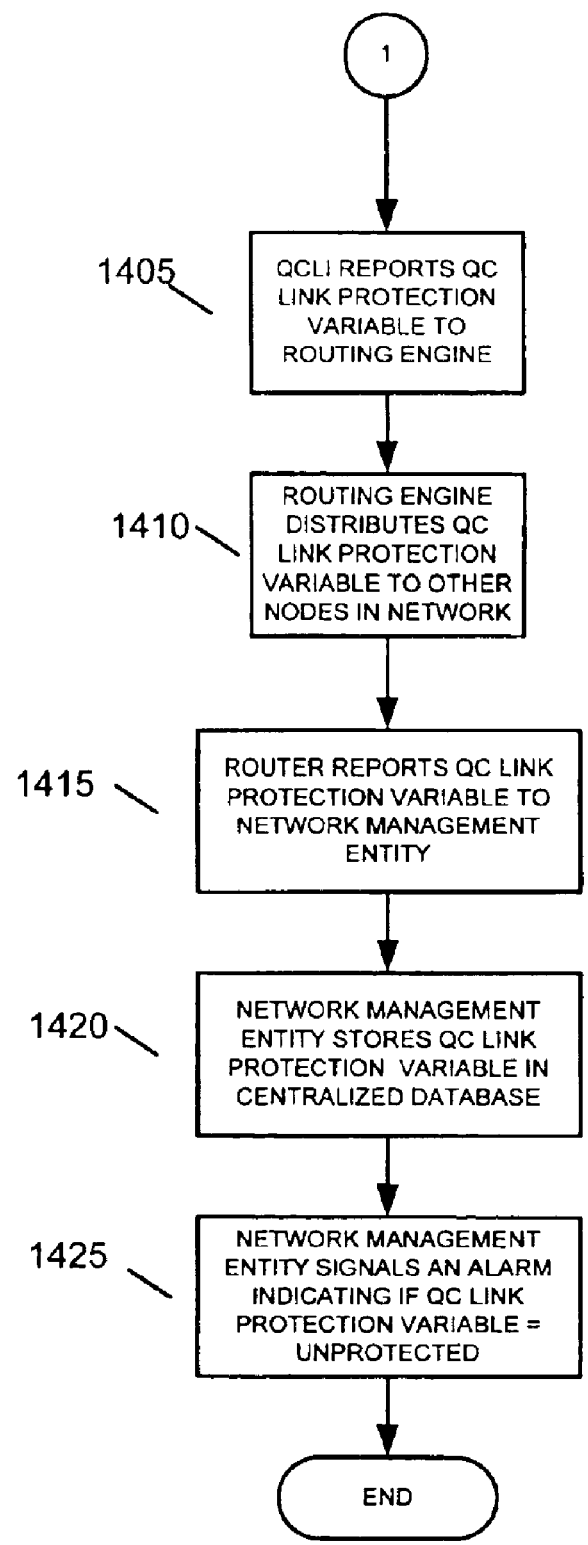

FIGS. 13-14 illustrate flowcharts of exemplary quantum cryptographic link security detection processing consistent with the present invention. The processing illustrated in FIGS. 13-14 uses conventional quantum cryptographic protocols to determine if eavesdropping has occurred on a link attached to a given QCLI or whether there has been a QCLI or link failure.

Link security detection processing begins with a QCLI (e.g., QCLI 630 of router 505 connected to link 554 acting as a "master") transmitting a sequence of photons in accordance with conventional quantum cryptographic protocols [step 1305] (FIG. 13). A receiving QCLI (e.g., a QCLI of router 510 acting as a "slave") receives the transmitted photons and evaluates the phase and/or polarization of the photons using conventional quantum cryptographic protocols [step 1310]. Based on the evaluation, the receiving QCLI determines, using conventional quantum cryptographic protocols, if eavesdropping has occurred on the link [step 1315].

For example, QCLI 630 of router 505 can randomly generate and store a sequence of phase or polarization values (e.g., 0, 45, 90 or 135 degree values for polarization) and apply these values, via phase/polarization modulator 1020, to a sequence of photons produced by photon source 1015. After transmission across link 554, the receiving QCLI of router 510 receives each photon at photon detector 1025 and measures each photon's polarization or phase. The QCLI of router 510 then reports the measurement results back to the QCLI of router 505. If no eavesdropping has occurred on link 554, then the measured polarization or phase of each photon received at the QCLI of router 510 should correspond to the actual polarization or phase of each photon transmitted from the QCLI of router 505. Based on quantum physics, however, if a rate of error in the measured polarization or phases of received photons exceeds a certain threshold, then eavesdropping on link 554 is indicated and can be noted at the QCLIs of routers 505 and 510. The above described eavesdropping detection technique merely represents one possible example of conventional quantum cryptographic eavesdropping detection. One skilled in the art will recognize that other conventional QC-techniques may be equivalently used. Furthermore, the various links in QC-network 105 can each be protected by different quantum cryptographic techniques, as long as each QCLI at either end of a given link are compatible. Thus, each node in QC-network 105 can "bridge" differing quantum encryption technologies.

Returning to FIG. 13, if conventional QC-protocols indicate that eavesdropping has occurred on the link, processing proceeds to step 1335 below. If there has been no eavesdropping, the QCLI of router 510 then determines if there has been a failure of the QCLI itself [step 1320]. For example, QCLI hardware and/or software failures may be noted at processing units 605 or 1010 using conventional error messages. If there has been no QCLI failure, the QCLI of router 510 may further determine if there has been a link failure on the quantum key channel [step 1325]. For example, the receiving QCLI may note the complete cessation of key transmissions over a link and conclude that the link has failed. If the QCLI of router 510 determines that there has been a link failure, processing proceeds to step 1335 described below. If there has been no link failure, the receiving QCLI sets the QC-link protection variable to "protected" and updates the appropriate entries of forwarding tables 720 and 725. At step 1335, the receiving QCLI sets the QC-link protection variable to "unprotected" and updates the appropriate entries of forwarding tables 720 and 725.

At step 1405 (FIG. 14), the QCLI of router 510 reports the QC link protection variable to the routing engine 710 being executed in processing unit 605. Routing engine 710 then distributes the QC-link protection variable to other nodes in network 105 [step 1410]. Additionally, the router with the receiving QCLI may report the QC link protection variable to a network management entity responsible for administering QC-network 105 [step 1415]. The network management entity can store the QC link protection variable in a centralized database [step 1420] and signal an alarm if the received QC link protection variable indicates a link is unprotected [step 1425].

Exemplary Forwarding Table Update Processing

Figure 15:
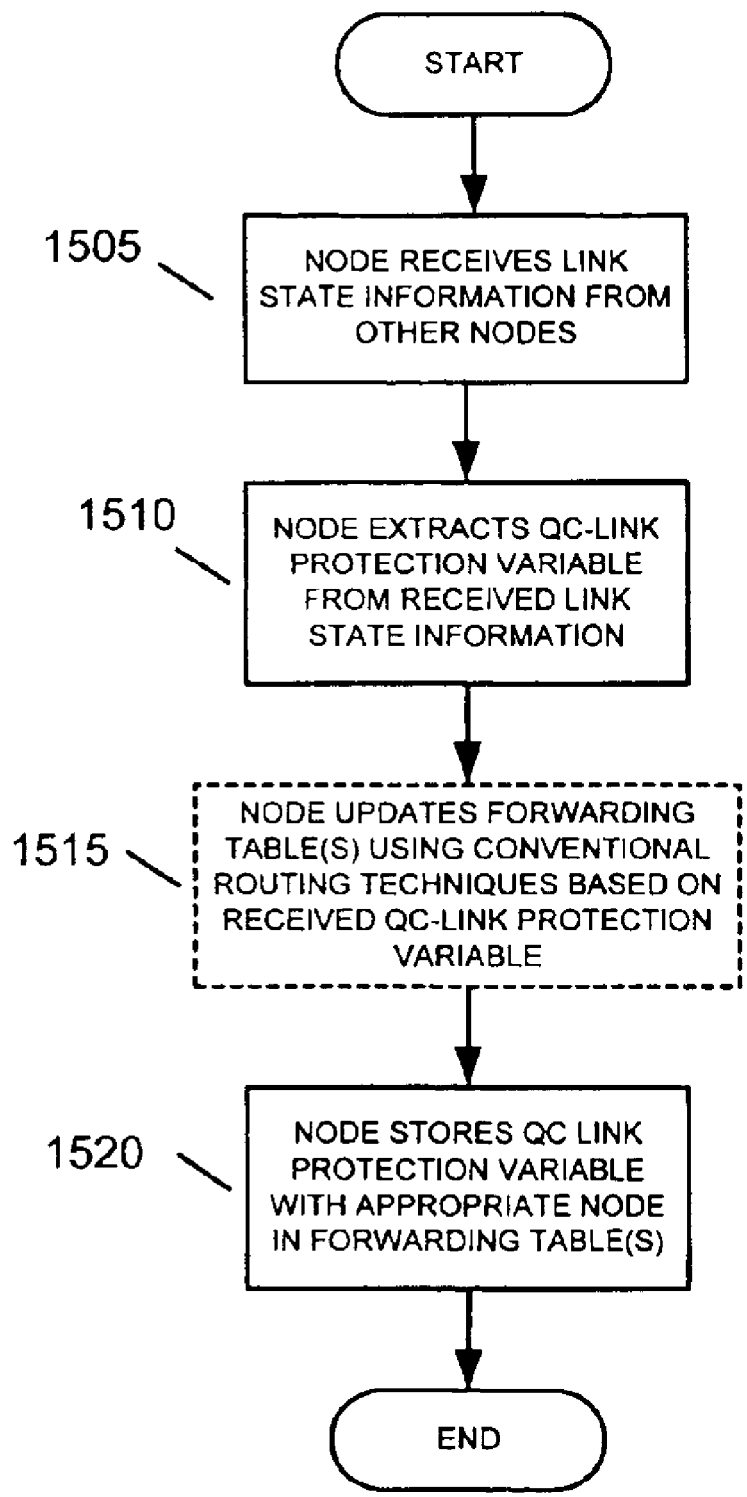
FIG. 15 illustrates exemplary link state distribution consistent with the present invention.

FIG. 15 illustrates a flowchart of exemplary forwarding table update processing consistent with the present invention. In accordance with conventional routing protocols, a node (e.g., router 505) in QC-network 105 receives link state information from other nodes [step 1505]. The node 505 extracts a QC-link protection variable from the received link state information [step 1510]. If QC-network 105 handles only secure traffic, node 505 may then update protected link forwarding table 725 based on the extracted QC-link protection variable [step 1515]. For example, node 505 may remove a link from service using conventional routing techniques if the extracted QC-link protection variable indicates that the link is unprotected.

Node 505 then may update forwarding table 720 and/or forwarding table 725 by storing the extracted QC link protection variable with the appropriate node in either forwarding table [step 1520]. As an example, during QC-link security detection processing (described above), router 525 (node G) determines that eavesdropping has occurred on the link between it and host 540 (node E). Router 525 therefore distributes an "unprotected" QC-link protection variable to other nodes in QC-network 105. The nodes that receive the link state information containing the "unprotected" QC-link protection variable update their forwarding tables accordingly.

Exemplary Host Message Processing

Figure 16:
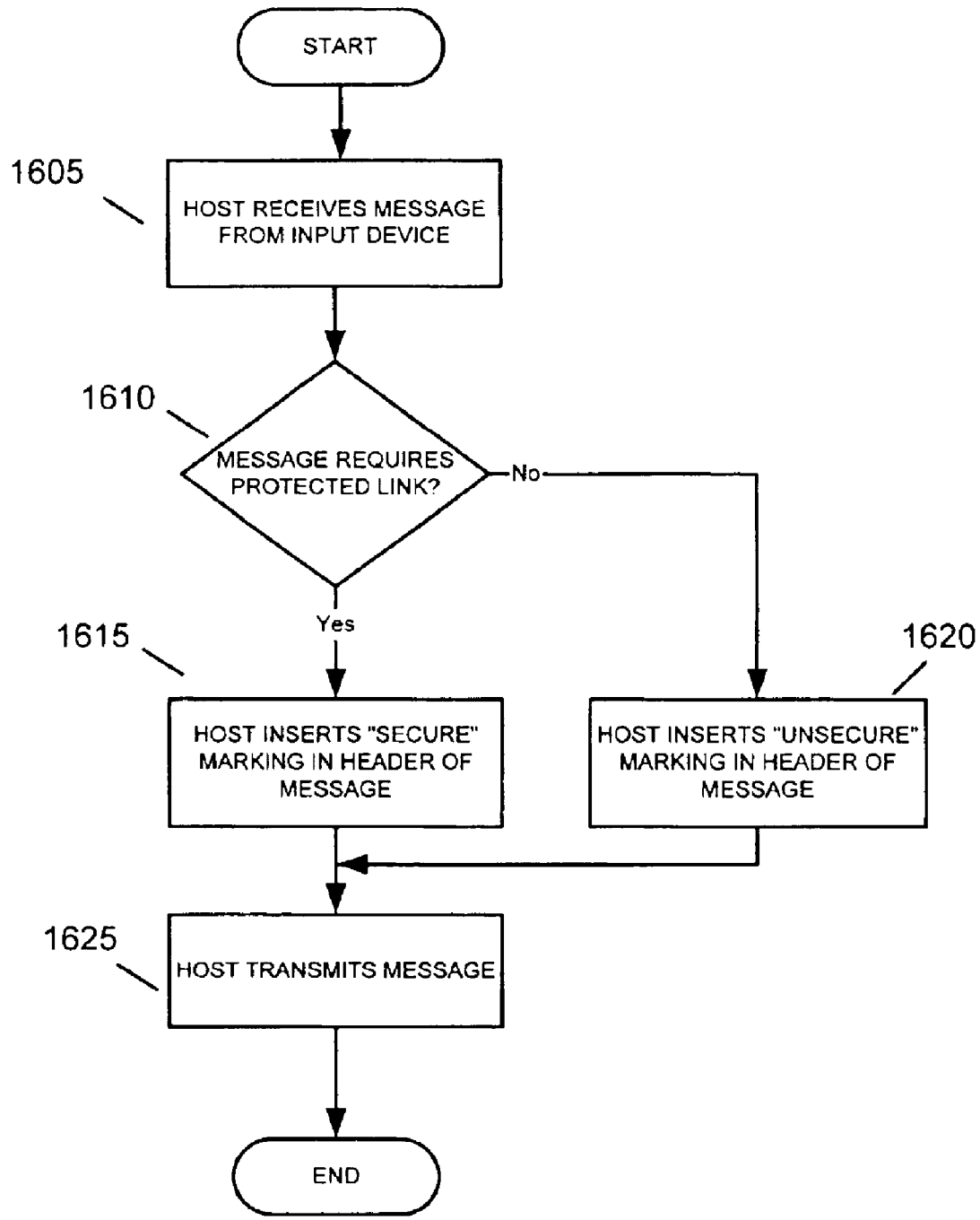
FIG. 16 illustrates exemplary system processing for transmitting a host message consistent with the present invention.

FIG. 16 illustrates a flowchart of exemplary host message transmission processing consistent with the present invention. A host (e.g., host 535) in QC-network 105 receives a message from input device 615 [step 1605]. In response thereto, the host 535 determines whether the message requires protected links [step 1610]. For example, a host operator may specify, via input device 615, that the received message contains highly sensitive information and therefore requires protected links. If the message does not require protected links, the host 535 inserts an "un-secure" marking in the header of the message [step 1620]. For example, the host may insert an "un-secure" marking in a "type of service" (TOS) indicator in the message header. However, if the message does require protected links, the host 535 inserts a "secure" marking in the header of the message [step 1615]. The host 535 completes the message processing by transmitting the message towards the intended destination node [step 1625].

Exemplary QC-Network End-to-End Message Processing

Figure 17:
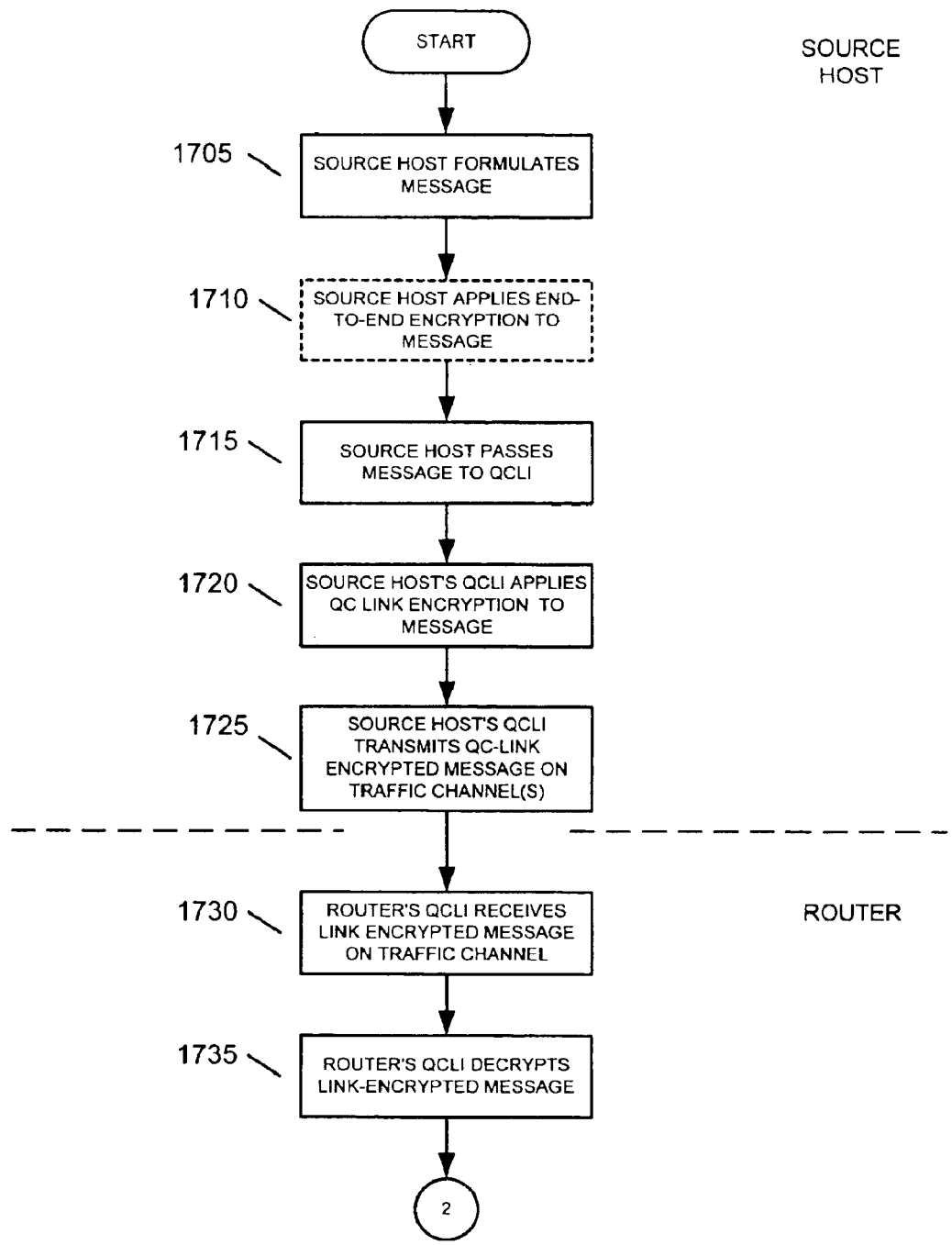
FIGS. 17–19 illustrate exemplary system processing for transmitting an encrypted message from a source host to a destination host in a quantum cryptographic network.
Figure 18:
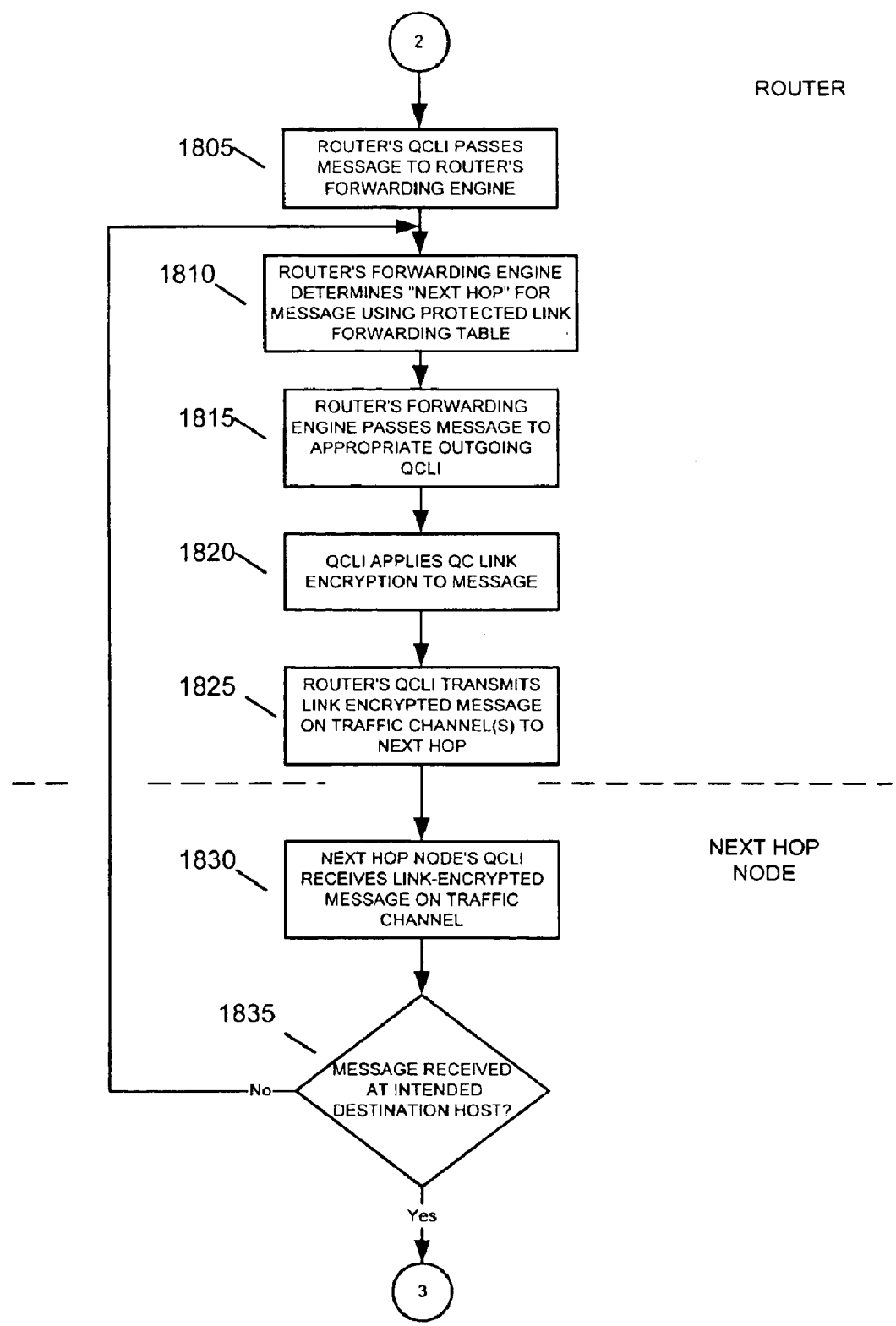
Figure 19:
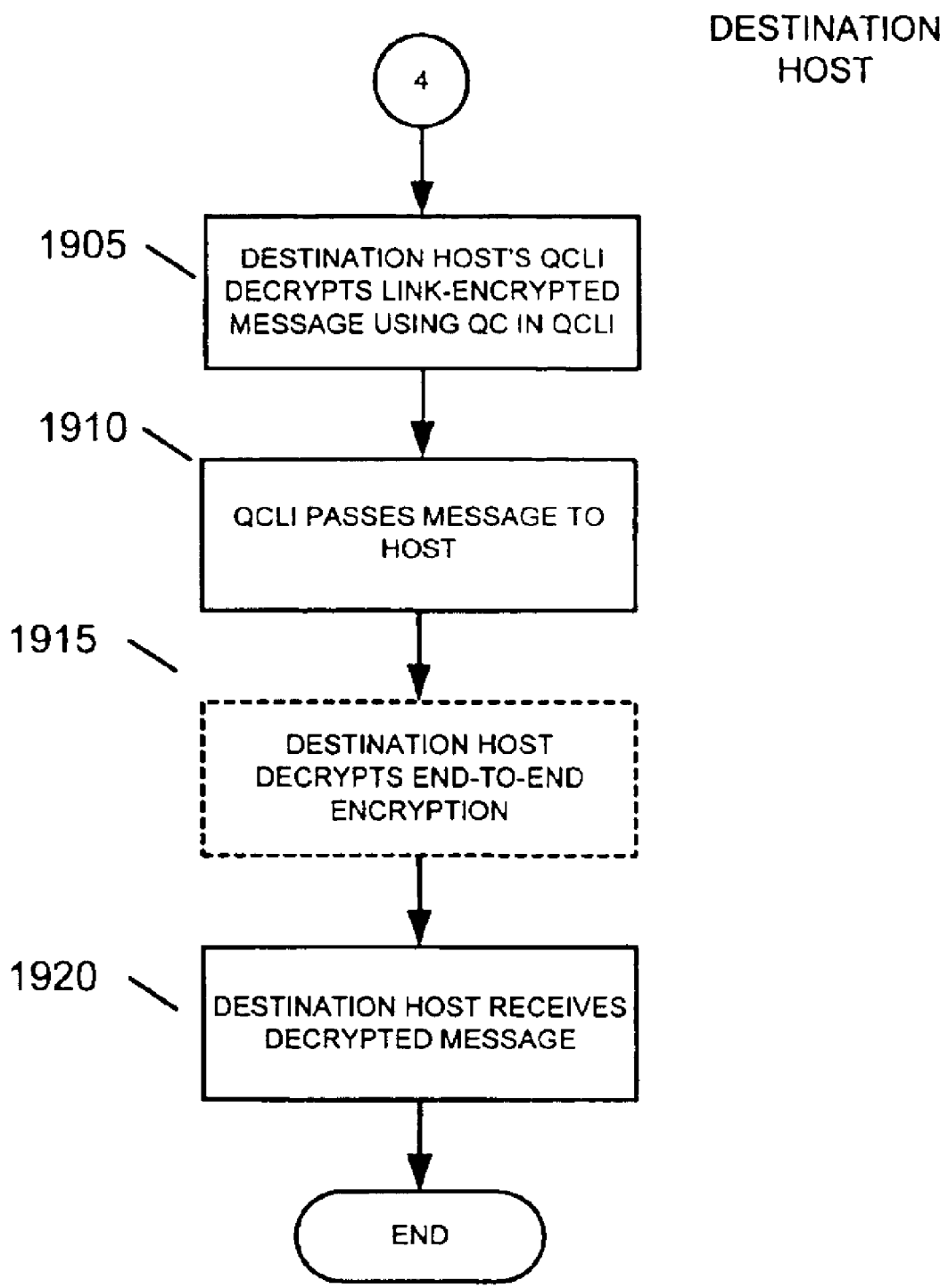

FIGS. 17-19 illustrate flowcharts of exemplary end-to-end quantum cryptographic network message transmission processing, consistent with the present invention, in the case where the source host requests transmission across protected links in a QC-network, such as QC-network 105. A source host (e.g., host 535) formulates a message for transmission, using for example, user input from input device 615 [step 1705]. The source host 535 then may optionally encrypt the formulated message [step 1710]. The host 535 may, for example, apply end-to-end encryption to the formulated message in accordance with conventional encryption techniques. The source host 535 then passes the message to the QCLI, such as QCLI 630 [step 1715]. The source host's QCLI 630 applies QC-link encryption to the message [step 1720]. The QCLI 630 may apply any conventional quantum cryptographic encryption technique. The source host's QCLI 630 then transmits the QC-link encrypted message on the QCLI's traffic channel [step 1725].

At step 1730, a router (e.g., router 505) in QC-network 105 receives the QC-link encrypted message on a traffic channel [step 1730]. The router's QCLI decrypts the QC-link encrypted message using conventional quantum cryptographic decryption techniques [step 1735]. The router's QCLI passes the message to the router's forwarding engine 715 [step 1805] (FIG. 18).

At step 1810, the router's forwarding engine 715 determines a next hop for the message using information from protected link forwarding table 725. The router's forwarding engine 715 passes the message to an appropriate outgoing QCLI [step 1815]. The outgoing QCLI applies QC-link encryption to the message [step 1820]. The router's QCLI transmits the link-encrypted message on the QCLI's traffic channel to the next hop node determined by forwarding table 725 [step 1825].

When the next hop node receives the message, the node determines if it is the message's intended destination host [step 1830]. For example, the next hop node may compare the destination address in the message header with the address assigned to the next hop node. If the next hop node determines that it is not the destination host, processing returns to step 1810 above. If the next hop node determines that it is the intended destination host, then the host's QCLI decrypts the QC-link-encrypted message using conventional quantum cryptographic techniques [step 1905] (FIG. 19). The destination host's QCLI passes the decrypted message to processing unit 605 [step 1910]. The destination host then may optionally decrypt any end-to-end encryption applied at the source host [step 1915]. The processing unit 605 of the destination host then receives the decrypted message [step 1920].

Exemplary Router Forwarding Processing

Figure 20:
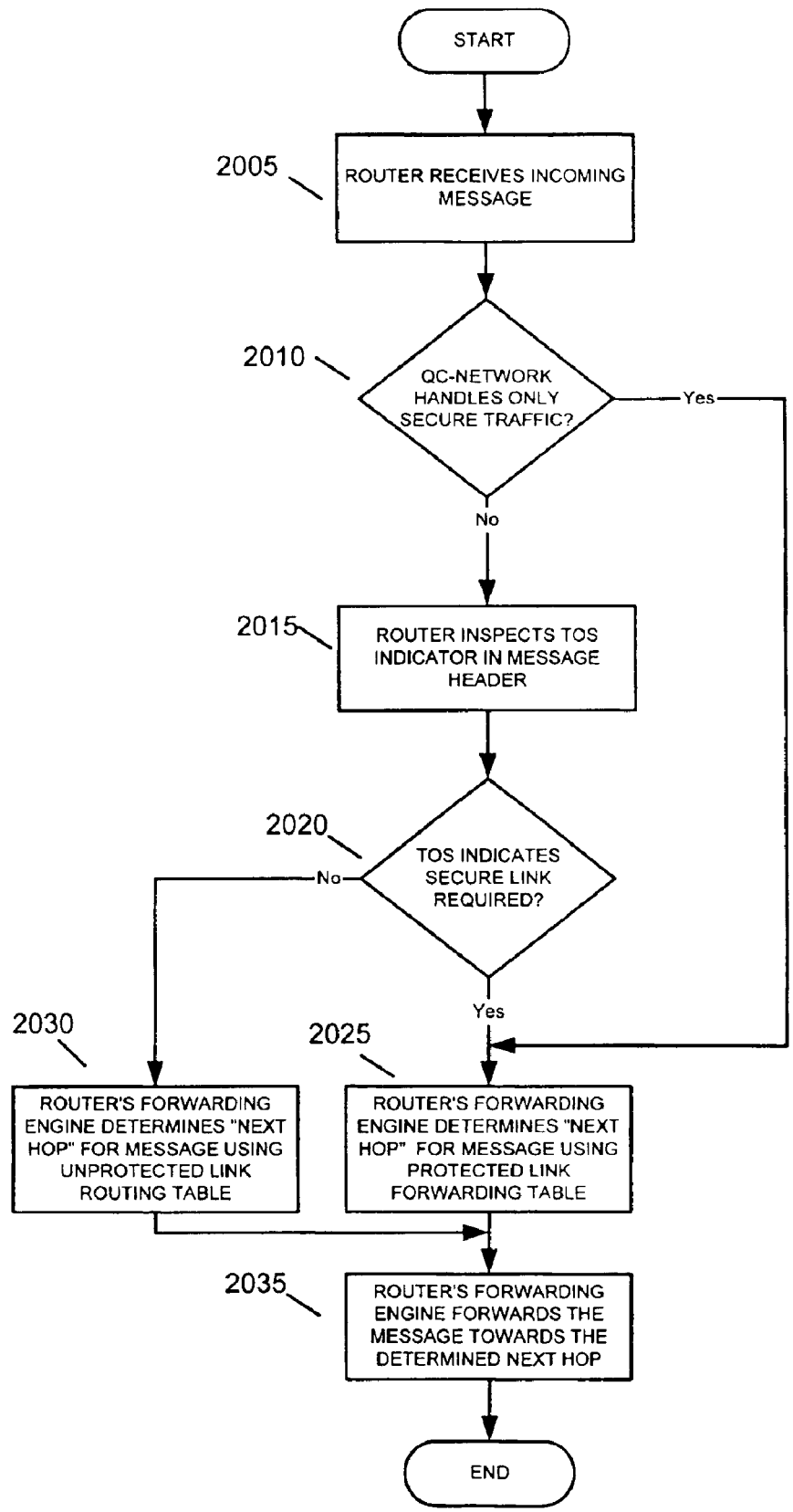
FIG. 20 illustrates exemplary system processing for forwarding a message received at a router in a quantum cryptographic network.

FIG. 20 illustrates a flowchart of exemplary router forwarding processing consistent with the present invention. A router (e.g., router 505) in QC-network 105 receives an incoming message either from another router or from a host [step 2005]. In one exemplary embodiment of the present invention, QC-network 105 may only handle secure messages and no secure/un-secure "type of service" marking may therefore be included in message headers. Therefore, if QC-network 105 handles only secure traffic [step 2010], processing continues at step 2025. If QC-network 105 handles both secure and un-secure traffic, processing continues at step 2015.

At step 2015, the router 505 inspects the "type of service" (TOS) indicator in the message header [step 2015]. The router 505 determines whether the TOS indicates that secure links are required for transmission of the message [step 2020]. If secure links are not required, the router's forwarding engine 715 determines the next hop for the message using forwarding table 720 [2030]. However, if secure links are required, the router's forwarding engine 715 determines the next hop for the message using protected link forwarding table 725 [step 2025]. The router's forwarding engine 715 then forwards the message towards the determined next hop [step 2035].

Exemplary QCLA Processing

Figure 21:
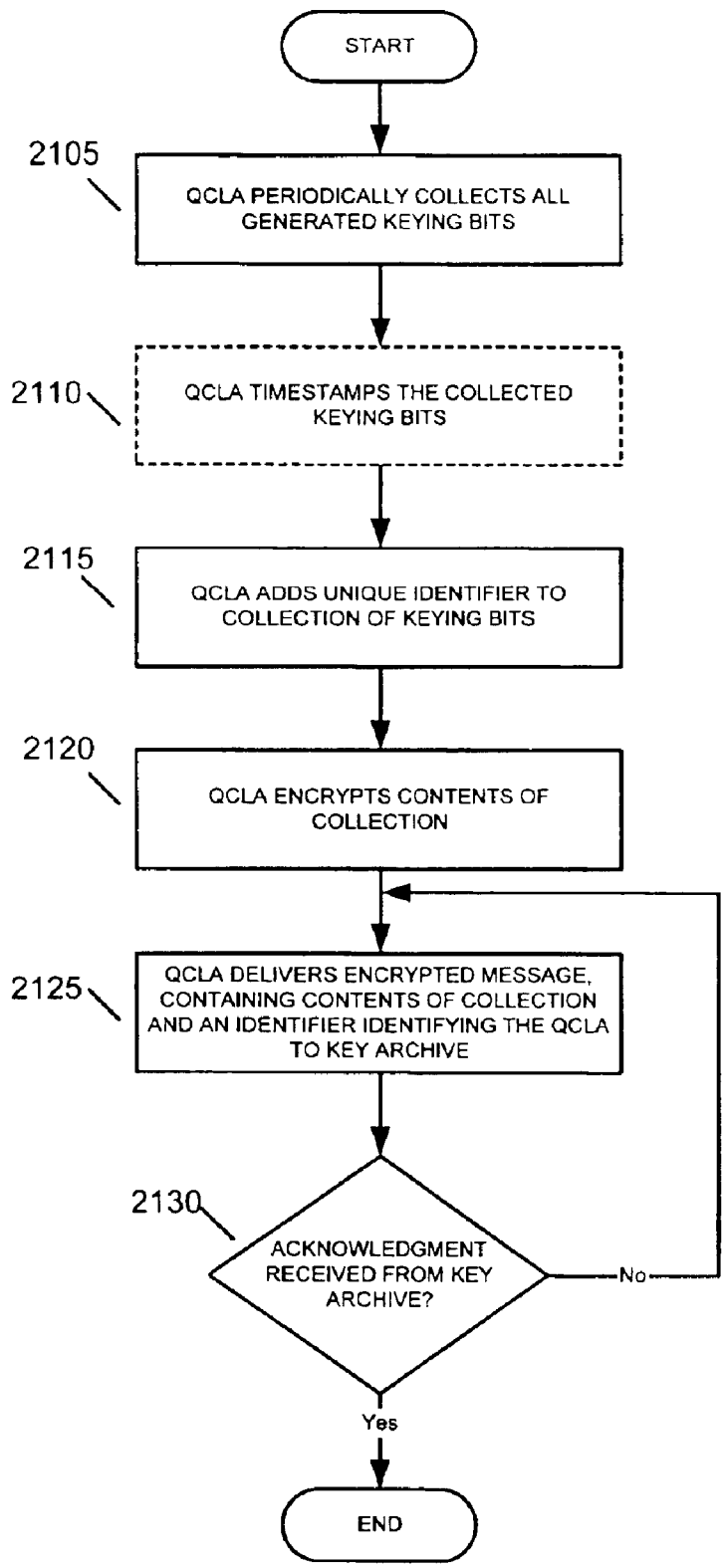
FIG. 21 illustrates exemplary quantum cryptographic link agent processing consistent with the present invention.

FIG. 21 illustrates a flowchart of exemplary QCLA processing consistent with the present invention. QCLA 730 periodically collects all keying bits that have been generated by QCLI 630 in accordance with conventional encryption techniques [step 2105]. The collected keying bits can include bits used to directly encrypt message traffic and bits that are used as "seeds" to a key generator that generates the keys that will actually generate the encryption bit-stream. QCLA 730 then may optionally time stamp the collected keying bits [step 2110]. An external clock source may be used for the time stamp such as, for example, a Global Positioning System (GPS) signal. The Network Time Protocol (NTP) may be another source of clock information. One skilled in the art will appreciate that any accurate source of clock information can be used in the present invention. Furthermore, if no accurate time source is available, an inaccurate source can be used together with an annotation that the clock source may be inaccurate.

QCLA 730 next adds a unique identifier to the collection of keying bits [step 2115]. The identifier may include any type of information that uniquely identifies the network link. For example, an IP address may be used as the unique identifier. As an additional example, a unique identifier for router 505 together with a unique identifier for the interface may be used. As a further example, a hardware unique identifier embedded in some component of the interface (e.g., in processing unit 1010 or network interface circuitry) may be used.

QCLA 730 then encrypts the collection of keying bits [step 2120]. QCLA can use any quantum cryptographic techniques including hardware or software encryption, or both. Conventional public key cryptography may be used and may include digitally signing the collection as well as encrypting the collection. End-to-end encryption can be employed by the QCLA 730 and the collection of keying bits, thus, can only be decrypted by key archive 10. The encryption technique used must ensure a high degree of security if the collection of keying bits should traverse any networks of lower security than QC-network 105.

QCLA 730 delivers an encrypted message containing an identifier identifying the QCLA and the collection of keying bits to key archive 110 [step 2125]. The encrypted message can be delivered asynchronously and by any reliable store-and-forward mechanism (e.g., e-mail). Alternatively, the encrypted message can be delivered in near real time by a reliable protocol such as, for example, Transmission Control Protocol (TCP). The QCLA determines if an acknowledgment is received from key archive 10 [step 2130]. If not, processing returns to step 2125. If an acknowledgment is received, the processing completes. QCLA 730 may store messages in memory 1005 that have been sent but not yet acknowledged by key archive 10.

Exemplary Key Archival Processing

Figure 22:
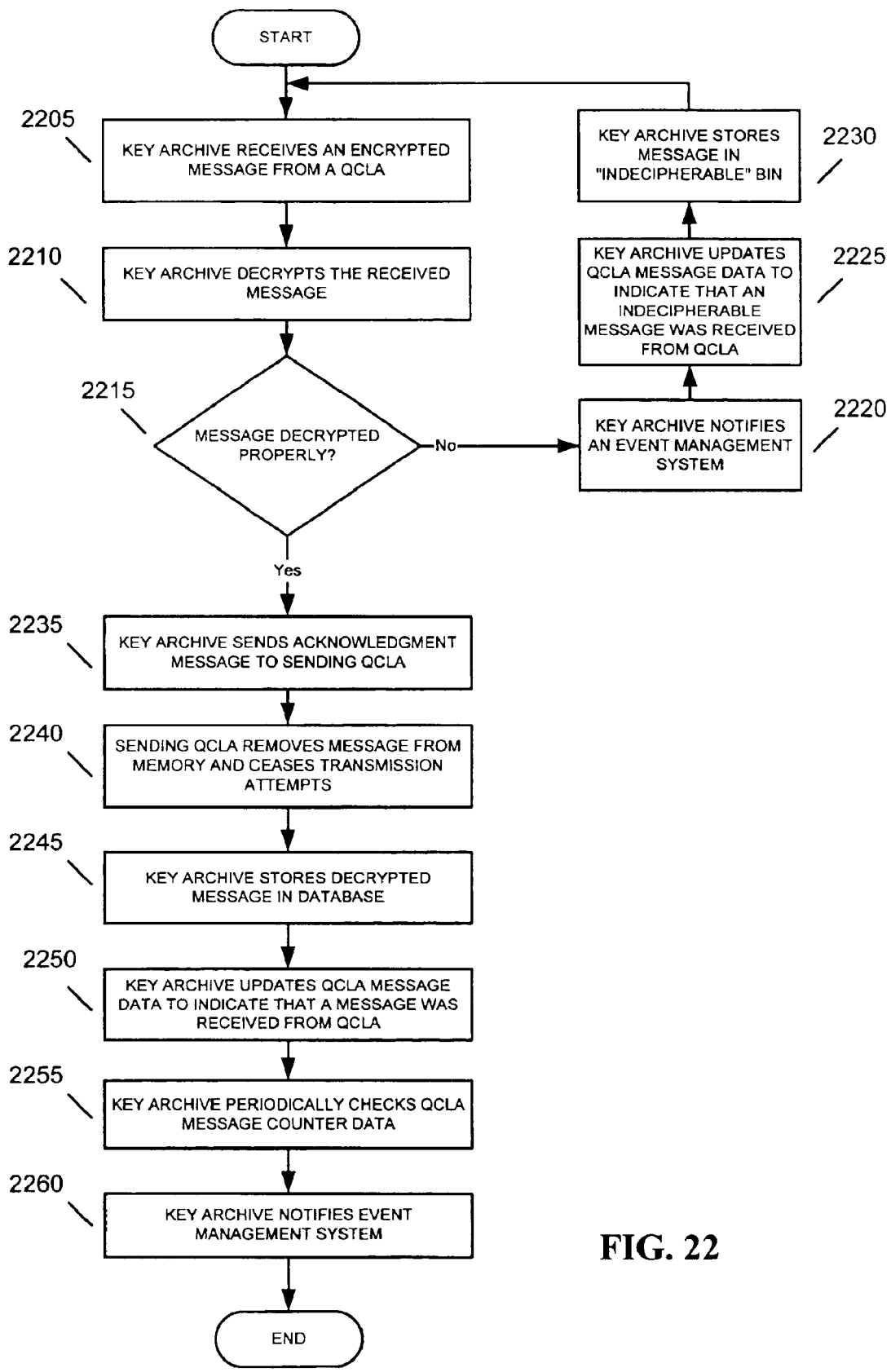
FIG. 22 illustrates exemplary key archival processing consistent with the present invention.

FIG. 22 illustrates a flowchart of exemplary encryption key archival processing consistent with the present invention. Key archive 10 receives an encrypted message from a QCLA, such as QCLA 730 [step 2205]. Key archive 110 decrypts the received message using conventional end-to-end decryption techniques [step 2210]. Key archive 110 determines if the message decrypted properly [step 2215]. If not, key archive 10 notifies an event management system [step 2220]. Key archive 10 further updates QCLA message counter data 410 to indicate that an indecipherable message was received from the QCLA [step 2225]. Key archive also stores the message in an "indecipherable" bin in database 325 [step 2230].

If key archive 10 determines that the message decrypted properly, the archive sends an acknowledgment message to the sending QCLA [step 2235]. In response to receipt of the acknowledgment, the sending QCLA can remove the message from memory 1005 and cease efforts to transmit the message to key archive 110 [step 2240]. Key archive 110 then stores the decrypted message with decrypted QCLA message data 405 in database 325 such that the message can be retrieved by its key bits, QCLA unique identifier, timestamp or any other appropriate indexes [step 2245].

Key archive 10 subsequently updates QCLA message counter data 410 to indicate that a message was received from the sending QCLA [step 2250]. Key archive 10 additionally may periodically check QCLA message counter data 410 to verify that the QCLAs within QC-network 105 are sending messages as expected [step 2255]. For example, if a specific QCLA within QC-network has failed and no messages are being received, QCLA message counter data 410 can keep track of the number of message received. Key archive 110 may notify an event management system that specific QCLAs are not sending messages as expected, or if too many indecipherable messages have been received from specific QCLAs [step 2260].

Exemplary Key Archive Validation Processing

Figure 23:
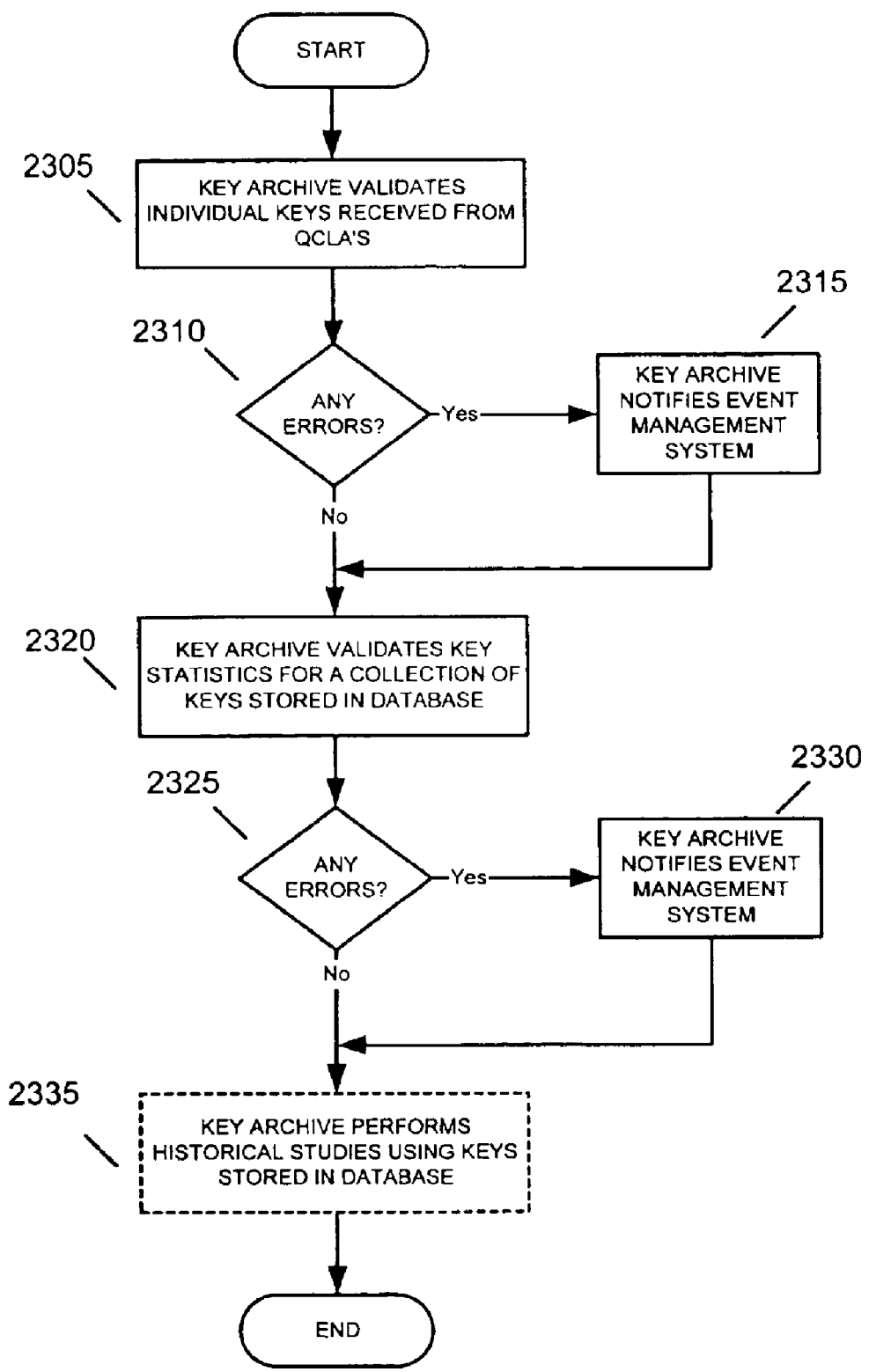
FIG. 23 illustrates exemplary key archive validation processing consistent with the present invention.

FIG. 23 illustrates a flowchart of exemplary encryption key archive validation processing consistent with the present invention. Key archive 10 may validate individual keys received from QCLA's in QC-network 105 [step 2305]. The individual keys can be inspected to ensure that each key meets appropriate standards. For example, if certain types of keys are known to not be employed in QC-network 105, then the received keys can be checked to ensure that they are not of this type of key. Using standards appropriate to the key being validated, key archive 1 10 determines if there are any validation errors [step 2310]. If so, key archive 10 may notify an event management system of the occurrence of validation errors [step 2315].

If no validation errors have occurred, key archive 110 may further validate key statistics for a collection of keys stored in database 325 and store the results in QCLA message statistics 415 of database 325 [step 2320]. One skilled in the art will appreciate that many different type of statistical techniques can be performed on some or all of the keys stored in database 325 to verify that the keys meet the statistical properties expected of them. For example, time series analysis can be used to check that key bits stored in database 325 do not correlate with time. As an additional example, various correlation tests can be employed to determine if the aggregate properties of all key bits stored in database 325 are acceptable. Key archive determines if there any key statistic validation errors [step 2325]. If so, then key archive 10 can notify an event management system of the occurrence of the errors [step 2330].

If no statistical errors have occurred, key archive 10 may additionally perform historical studies on keys stored in database 325 [step 2335]. For example, if a long segment of encrypted text is discovered in QC-network 105 or network 115, then the segment of encrypted text can be tested to verify if it can be decrypted using any of the keys stored in database 325. If so, then the encrypted text must have been taken from an eavesdropped line, and the time and place of eavesdropping can be ascertained using, for example, header data accompanying the encrypted text.

CONCLUSION

Systems and methods consistent with the present invention implement quantum cryptographic techniques that can ensure the privacy of encrypted data transmitted across multiple nodes and links within a packet-switching network. Systems and methods consistent with the present invention additionally implement key archives that can receive and store encryption keys generated at nodes throughout a quantum cryptographic network. The key archives permit auditing of the received encryption keys that can detect failures in network quantum cryptographic mechanisms.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. No element, step, or instruction used in the description of the present application should be construed as critical or essential to the invention unless explicitly described as such. The scope of the invention is defined by the following claims and their equivalents.

What is claimed is:

1. A method of archiving quantum-cryptographic encryption keys used for encrypting information in a network, comprising:

collecting one or more encryption keys generated at at least one node in said network;

transmitting the one or more collected encryption keys to a key archive; and storing said collected encryption keys in a database of said key archive.

2. The method of claim 1, further comprising:

time-stamping the one or more collected encryption keys.

3. The method of claim 1, further comprising:

tagging the one or more collected encryption bits with an identifier identifying a link of said network.

4. The method of claim 3, wherein said link of said network employed at least one of the collected encryption keys for encrypting data.

5. The method of claim 1, further comprising:

encrypting said collected encryption keys before transmitting said keys to said key archive.

6. The method of claim 1, further comprising:

digitally signing said collected encryption keys before transmitting said keys to said key archive.

7. A method of archiving encryption keys used for encrypting information in a network, comprising:

receiving encryption keys generated at a plurality of nodes in a network;

storing said received encryption keys in an encryption key archived; and determining whether at least one of said encryption keys satisfies given standards wherein said determining further comprises statistically analyzing said at least one of said encryption keys.

8. The method of claim 7, further comprising:

notifying an entity if at least one of said encryption keys does not satisfy said given standards.

9. The method of claim 7, wherein said step of statistically analyzing further comprises:

performing a correlation analysis to determine whether at least one of said encryption keys correlates with a specified parameter.

10. A computer-readable medium containing instructions for controlling at least one processor to perform a method of archiving encryption keys used for encrypting information in a network, the method comprising:

obtaining encryption keys generated at a plurality of nodes in a network;

storing said received encryption keys in a database of an encryption key archive; and determining whether at least one of said encryption keys satisfies given standards wherein said determining further comprises statistically analyzing at least one of said encryption keys.

11. The computer-readable medium of claim 10, the method further comprising:
notifying an entity if at least one of said encryption keys does not satisfy said given standards.

12. The method of claim 10 wherein said step of statistically analyzing further comprises:
performing a correlation analysis to determine whether at least one of said encryption keys correlates with a specified parameter.

13. A quantum-cryptographic encryption key archive, comprising:
a memory configured to store instructions; and
at least one processor configured to execute the instructions to:
receive quantum-cryptographic encryption keys from a plurality of nodes in a network, and
store said received encryption keys in a database associated with said encryption key archive.

14. A system for archiving quantum-cryptographic encryption keys used for encrypting information in a network, comprising:
means for collecting one or more encryption keys generated at at least one node in said network;
means for transmitting the one or more collected encryption keys to a key archive; and
means for storing said collected encryption keys in a database of said key archive.

15. A method of auditing encryption keys used for encrypting information in a network, comprising:
collecting one or more encryption keys generated at a node for encrypting data;
providing the one or more collected encryption keys to a key archive;
storing said collected encryption keys in a database of said key archive; and
determining whether at least one of said one or more collected keys satisfies given standards wherein said determining further comprises statistically analyzing at least one of said one or more collected keys and wherein said statistically analyzing further comprises performing a correlation analysis to determine whether at least one of said one or more collected keys correlates with a specified parameter.

16. The method of claim 15, further comprising:
notifying an entity if said one or more collected keys does not satisfy said given standards.

17. A computer-readable medium containing instructions for controlling at least one processor to perform a method of auditing encryption keys used for encrypting information in a network, the method comprising:
receiving one or more encryption keys;
providing the one or more received encryption keys to a key archive; and
determining whether at least one of said one or more received keys satisfies given standards wherein said determining further comprises statistically analyzing at least one of said one or more received keys, and wherein said statistically analyzing further comprises performing a correlation analysis to determine whether at least one of said one or more received keys correlates with a specified parameter.

18. The computer-readable medium of claim 17, the method further comprising:
notifying an entity if said one or more received keys does not satisfy said given standards.

19. An encryption key archive, comprising:
a memory configured to store instructions and encryption keying bits; and
at least one processor configured to execute the instructions to:
receive one or more encryption keying bits generated at a node for encrypting data, and
statistically analyze at least one of said one or more keying bits.

20. A data structure encoded on a computer readable medium, comprising:
a plurality of encryption key bits received from a plurality of nodes in a network,
data indicating parameters associated with nodes employing cryptographic techniques in said network.

21. The data structure of claim 20, wherein said parameters indicate a number of indecipherable messages transmitted from each of said nodes.

22. The data structure of claim 20, wherein said parameters indicate a total number of messages transmitted from each of said nodes.

23. The data structure of claim 20, wherein said parameters indicate a number of failures associated with validations performed on said encryption key bits.

24. A method of transmitting quantum-cryptographic encryption keys used for encrypting information at a node in a network to a key archive, comprising:
collecting one or more encryption keys generated at the node; and
transmitting the one or more encryption keys to the key archive.

25. A system for archiving quantum-cryptographic encryption keys used for encrypting information in a network, comprising:
a plurality of nodes configured to:
collect one or more encryption keys generated at each node, and
transmit the one or more collected encryption keys to a key archive for storage in a database associated with the key archive, and
a key archive configured to:
receive encryptions keys transmitted from nodes in the network,
store the encryption keys in a database of the key archive.

26. A method of archiving quantum-cryptographic encryption keys used for encrypting information in a network, comprising:
receiving quantum cryptographic encryption keys generated at a plurality of nodes in a network; and
storing said received encryption keys in an encryption key archive.

27. A computer-readable medium containing instructions for controlling at least one processor to perform a method of archiving quantum-cryptographic encryption keys used for encrypting information in a network, the method comprising:
obtaining quantum-cryptographic encryption keys generated at a plurality of nodes in a network; and
storing said received encryption keys in a database of an encryption key archive.

28. A method of auditing quantum-cryptographic encryption keys used for encrypting information in a network, comprising:

collecting one or more quantum-cryptographic encryption keys generated at a node for encrypting data:

providing the one or more collected encryption keys to a key archive, storing said collected encryption keys in a database of said key archive; and determining whether at least one of said one or more collected keys satisfies given standards.

29. A computer-readable medium containing instructions for controlling at least one processor to perform a method of auditing quantum-cryptographic encryption keys used for encrypting information in a network, the method comprising:

receiving one or more quantum-cryptographic encryption keys;

providing the one or more received encryption keys to a key archive; and determining whether at least one of said one or more received keys satisfies given standards.

* * * * *